Feb. 12, 1946. W. MIESEGAES 2,394,711
QUESTION AND ANSWER DEVICE
Filed Nov. 23, 1943 2 Sheets-Sheet 1
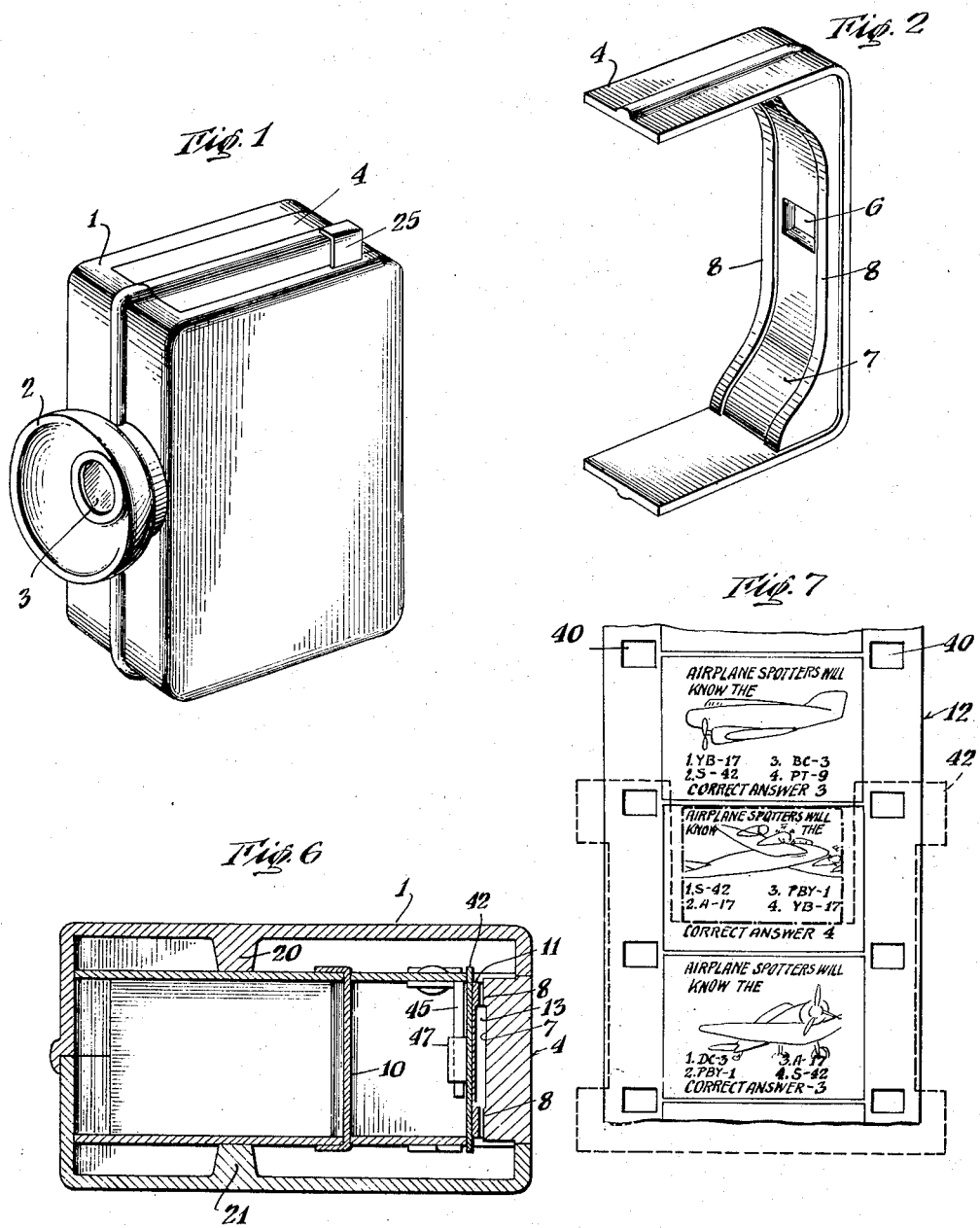

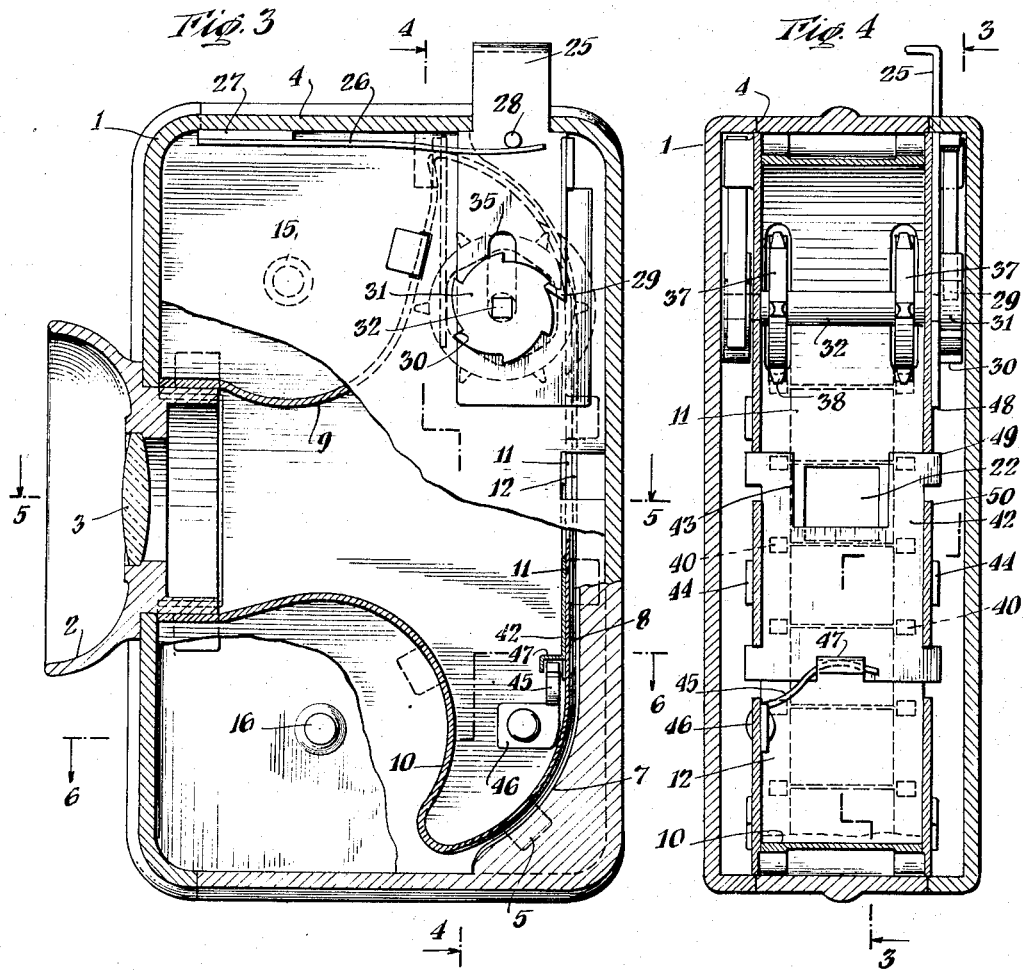
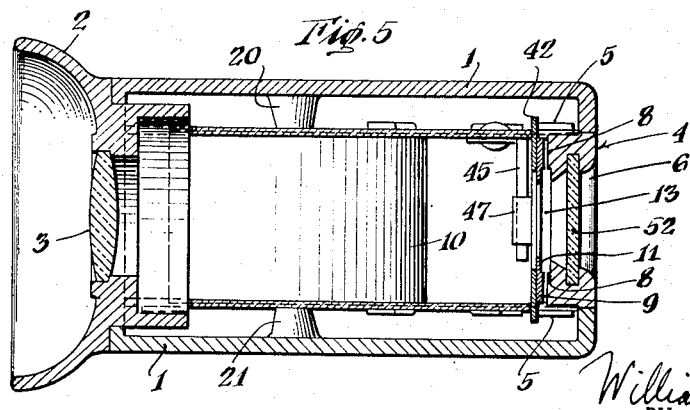

Patented Feb. 12, 1946

2,394,711

UNITED STATES PATENT OFFICE 2,394,711

QUESTION AND ANSWER DEVICE

William Miesegaes, New York, N. Y.

Application November 23, 1943, Serial No. 511,416

3 Claims. (Cl. 35—9)

This invention relates to devices for viewing transparent films and is more particularly concerned with a device for exhibiting a succession of pictures or views on a transparent film.

Objects and advantages of the invention will be set forth in part hereinafter and in part will be obvious herefrom, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a perspective elevation of an embodiment of the device for exhibiting films in accordance with the present invention;

Fig. 2 is a perspective elevation of the back section of the device of Fig. 1;

Fig. 3 is a sectional view on the lines 3—3 of Figure 4 showing the operating mechanism of the device of Fig. 4;

Fig. 4 is a sectional view of the device as taken on the lines 4—4 of Fig. 3;

Fig. 5 is a sectional view of the device as taken on the lines 5—5 of Fig. 3;

Fig. 6 is a sectional view of the device as taken on lines 6—6 of Fig. 3; and

Fig. 7 is a view of the film which may be used in the device of Fig. 1 and showing the specific mask arrangement in accordance with this invention.

It is the object of this invention to provide a film exhibitor wherein a strip of film is moved to bring successive pictures into a viewing position positively and surely without any of said pictures being out of alinement with an illuminating window.

A further object of the invention is to provide a novel and useful film exhibitor having means whereby a portion of each picture on a strip of film adapted to be moved past an illuminating window is covered and remains hidden until it is desired to complete that specific picture by uncovering this portion.

It is another object of the invention to provide a novel and useful film exhibitor which is capable of exhibiting a picture without an identification and to thereafter exhibit this identification when desired.

Other objects of the invention are to provide a film exhibitor of rugged yet simple construction and operation and having means to positively keep the portion of the film being viewed in a focal position relative to a viewing lens; to provide a one stroke positive actuation for moving the film from one picture to another; and to provide an easily dismantled film exhibitor of novel and useful design.

Generally, the invention provides a film exhibitor comprising two parts adapted to be fitted together and having an illuminating window at one side and an eye-piece preferably with a lens, at the opposite side. A strip of film having a plurality of pictures thereon is carried in the device and passes from one portion to another portion across said window to progressively present the pictures for viewing through said lens. The film will preferably have the usual perforations at its edges and to carry the film forward, pins on a sprocket wheel engage in the perforations as the sprocket is rotated by means of a toothed wheel. This toothed wheel is rotated to move the film by a plunger or lever, spring pressed upwardly and located partly outside the casing of the device, which is depressed against the spring to push down a hook which upon release engages a tooth on the wheel and moves this through a predetermined rotation to move the film the length of one picture or to bring a picture into register with the window.

It is an important feature of the invention to have a portion of the picture hidden and adapted to be uncovered when desired, for example, to expose an answer to a query on the picture after the person viewing the picture has had an opportunity to study same. Accordingly, a mask partly covers the picture and when the plunger is depressed the mask is forced away from the portion covered to expose this. Thus, during progressive viewing of the pictures on the film, the portion hidden normally is uncovered before the next picture is brought into position.

The film is constantly guided in its travel and is held in a focal position relative to the lens at least in the position before the window.

Thus, the device is ideally suited to educational pictures where the answer to a problem is given on the picture but it is desirable to hide this answer.

In use the person using the exhibitor places the lens piece to one eye and directs the window toward a good source of illumination. Then the plunger is depressed by a finger or thumb. Upon the first depression the mask is removed exposing, for example, the answer to the problem posed by the picture still in viewing position. While the plunger remains depressed this answer is visible. When the plunger is released, the next picture is automatically located centered with respect to the window but the mask covers the lower portion.

This can be uncovered whenever the plunger is again depressed.

The film to be viewed is loaded by taking the two sections of the device apart and locating the film on suitable guide members and into the feeding device.

Referring specifically to Fig. 1 which shows the exhibitor as in elevation in assembled form, the main casing 1 has an eye-piece 2 attached to the front wall thereof, with a suitable lens 3 mounted therein. A back section 4, shown specifically in Fig. 2, is adapted to be slipped into engagement with casing 1 by engagement of the sides thereof with a guide part of the casing being retained therein by frictional engagement, or alternatively by any clip or spring grip arrangement, such as spring clips 5 shown in Figs. 3 and 5. A rear window 6 is formed in back section 4, this being in line with lens 3 whereby a transparent film placed before window 6 will be illuminated thereby and be observed by looking through lens 3. The transparent film is carried within casing 1 and held in operative position for viewing by the shaped portion 7 of section 4, shown in Fig. 2. To retain the film in position before the window 6 side shoulders 8 are provided shaped to the same contour as portion 7 and being of a width to accommodate the film between the shoulders snugly to form a guide.

Referring now specifically to Figs. 3 and 4 which show the internal guide construction and operative mechanism for moving the film, a shaped guide member 9 is arranged in the upper portion of the casing 1 with a similarly shaped guide member 10 in the lower portion, these two portions being connected by a substantially straight guide member 11, the film 12 occupying the straight guide member 11 thereof when in a central position and being adapted to pass from the shaped guide member 9 to the shaped guide member 10 by mechanism to be described, whereby the pictures on the film will be progressively located before window 6 to be viewed by lens 3.

The straight guide member 11 is located close to the guide 7 as clearly shown in Figs. 5 and 6 and these two guides form a slot 13 in which the film 12 can move and be accurately guided by the window 6. Thus, the film will be held in a focal position relative to the lens 3 by the slot 13. Each of the shaped guide members 9 and 10 are of generally curved contour and form preferably a semi-circle embracing a suitable support for each end of the film. Thus, member 9 embraces a support 15 and member 10 embraces a support 16. These supports 15 and 16 preferably comprise a pair of pins of large diameter 20, 21 as shown in Figs. 5 and 6.

The purpose of supports 15 and 16 is to permit the transparent film 12 to be coiled upon itself as it runs off the curved section of member 9 or 10 during the movements of the film by window 6. The guide member 11 is cut away at 22 (Fig. 4) to form a window similar in size to window 6 and permit viewing of the portion of film 12 before window 6 by lens 3. It will thus be obvious that a piece of transparent film having a plurality of pictures thereon can be passed from support 15 to support 16, or vice versa, through slot 13 and permit progressive viewing of the pictures through lens 3 as they become associated with windows 22 and 6.

In order to progressively exhibit the series of pictures on the film means are provided for moving the film automatically into position in front of the window 6 and correctly alined therewith.

To this end there is mounted in casing 1 a plunger or lever 25 adapted to be depressed, for example, by the finger or thumb of a person using the exhibitor against the action of a spring 26 attached to casing 1 as at 27 and operating against a pin 28 on plunger 25 to constantly urge this upwardly and projecting from the casing 1. Plunger 25 is suitably guided for its movements within the casing 1 and carries attached to one part thereof a hook 29 which is adapted to engage teeth 30 on a toothed wheel 31 mounted for rotation on a shaft 32. Shaft 32 passes through a slot 35 in the body of plunger 25 to make a simple and concise arrangement of parts whereby downward depression of plunger 25 will cause rotation through a predetermined degree of wheel 31, the amount of rotation depending upon the shape and number of teeth 30 on wheel 31 and the length of stroke given to hook 29 by plunger 25.

Mounted also on shaft 32 and adapted to be driven by rotation of wheel 31 are a pair of driving sprockets 37 each of which have on their periphery a plurality of driving pins 38.

In exhibitors of the type with which this invention is generally concerned it is usual to utilize a transparent film of the type having perforations on the edges and accordingly, if this type of film is used, the pins 38 will engage with such perforations 40, whether on one edge or on both edges of the film, and actively drive the film forward to position successive pictures before the window 6.

However, this invention contemplates other forms of drive for the film if this is not so perforated such as the pins 38 being sharp pointed and acting to stick into the film to drive same.

The film 12 will now be successively moved past the window 6 through the slot 13 and by correctly proportioning the number and spacing of pins 38 it is possible to accurately place the picture to be viewed in position before the window 6.

It is a feature of this invention to provide means whereby a portion of each picture exhibited is covered or unobserved until such time as it is desired to exhibit this portion. In Fig. 7 there is shown a typical film where this feature is of advantage. The film 12 shows a number of pictures each one being in this case an airplane, and a query is given on each picture with the correct answer on a lowermost portion. It is desired to keep this answer hidden until the person using the exhibitor has had an opportunity to submit the answer after which the correct solution is given.

To this end, a movable mask 42 is provided shaped to have a portion 43 cut away to expose the film for viewing through the window 6 but having the lowermost portion of the window, and thus the film located before it, hidden from view of the lens 3 by the rest of the mask 42.

Normally, mask 42 is held upwardly and in position to mask the lower portion of the film, which will be the "correct answer" on the film shown in Fig. 7, by a spring 45 fastened at one end 46 to the inside of casing 1 and contacting a lug 47 on mask 42 at the other end thus constantly urging mask 42 upwardly.

Mask 42 is slidingly mounted and is adapted to be pushed down against the action of spring 45 to expose the answer, and to this end the end 48 of plunger 25 in its lowered position strikes one corner 49 of the mask 42 in its upward position and, upon continued downward pressure upon plunger 25, the mask 42 slides down to expose the answer, abutting against a portion 50 of member 11 to terminate the downward movement.

Thus, extreme depression of plunger 25 causes the answer to be exposed and as long as the plunger 25 is held down the lower portion of the film, together with the already viewed portion will be visible through lens 3.

Upon release of the plunger 25 the wheel 30 will be rotated by hook 29 and another picture, but with the lower portion hidden, will be exposed to view, the answer thereto being exposed by depression again of the plunger 25.

In operation, the back section 4 is removed from casing 1 and a film is placed around support 15 and threaded into engagement with pins 38 over guide 9. Thereafter, depressions of plunger 25 will successively present the main part of the pictures on the film and then their other portions as desired.

When the film is exhausted, it can be removed from support 15 and guide 9 on which it now rests, by removing back section 4 from casing 1, and replaced on support 16 or removed and a different film placed on support 16.

The window 6 may be rendered more useful by inserting a piece of frosted glass 52 therein, this serving to disperse the light as the device is directed toward same by a person using it, who applies one eye to the eye-piece 2. The guide members 9, 10 and 11 are held in place and in alinement by suitable lugs 44 attaching the guide members to the casing.

The educational and similar uses of this exhibitor are obviously great, and the device is useful wherever it is desired to exhibit only a part of a picture after which the other part thereof can be exhibited at will.

Furthermore, the provision for locating the picture to be viewed automatically in position before the window and in guided focal position relative to the viewing lens is of great usefulness.

The invention in its broader aspects is not limited to the specific mechanisms shown and described but departures may be made therefrom within the scope of the accompanying claims without departing from the principles of the invention and without sacrificing its chief advantages.

What I claim is:

1. A device for viewing questions and answers on a film strip comprising in combination a casing, a window in one wall thereof, a viewing lens in the opposite wall thereof, a spring means for periodically feeding a strip of film past said window to successively expose a series of pictures for viewing by said lens, a plunger for actuating said spring means, means for masking a portion of each of said pictures as it comes to position between said window and said lens, and means actuated by depression of said plunger for removing said mask from said portion whenever desired.

2. A device for viewing questions and answers on a film strip comprising in combination a casing, a window in one wall thereof, a view lens in the opposite wall thereof, a series of guides for leading a strip of film having a series of pictures thereon through said casing and past said window to be viewed by said lens, a vertically operated plunger projecting from said casing, means carried by said plunger and operated upon its movement in one direction to rotate a wheel through a predetermined number of degrees, means driven by said wheel to move said film longitudinally under said vertical movement of the plunger in an amount sufficient to register each picture of the series successively with said window, and a mask normally covering a part of the window and picture before the window and movable under urge of part of the movement of said plunger in the other direction to be displaced to expose the covered portion of the picture.

3. A device for viewing questions and answers on a film strip comprising a casing formed of two parts, a window in one part, a viewing lens in the other part, means carried within the casing for periodically moving a strip of film past said window in an amount to register successively a series of pictures with said window, a plunger normally spring urged upwardly and extending beyond said casing adapted to cause increments of movement of said means for moving said film, upon a complete depression of the plunger against its spring, and a mask adapted to cover a portion of each picture as it becomes registered with the window, said mask being normally spring urged to cover said portion and being forced against its spring to uncover said portion upon depression of said plunger.

WILLIAM MIESEGAES.